Figure 2:
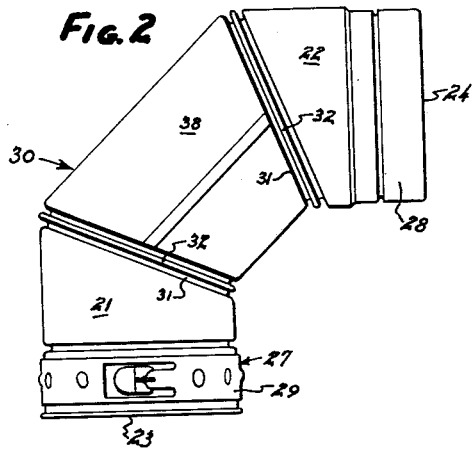

Nov. 28, 1961 R. BELLATORRE 3,010,506
METHOD AND APPARATUS FOR PROVIDING A THREAD-LIKE
COUPLING BEAD ON THIN-WALLED PIPE
Filed April 6, 1959 6 Sheets-Sheet 1

INVENTOR.
RENATO BELLATORRE
BY
ATTORNEY

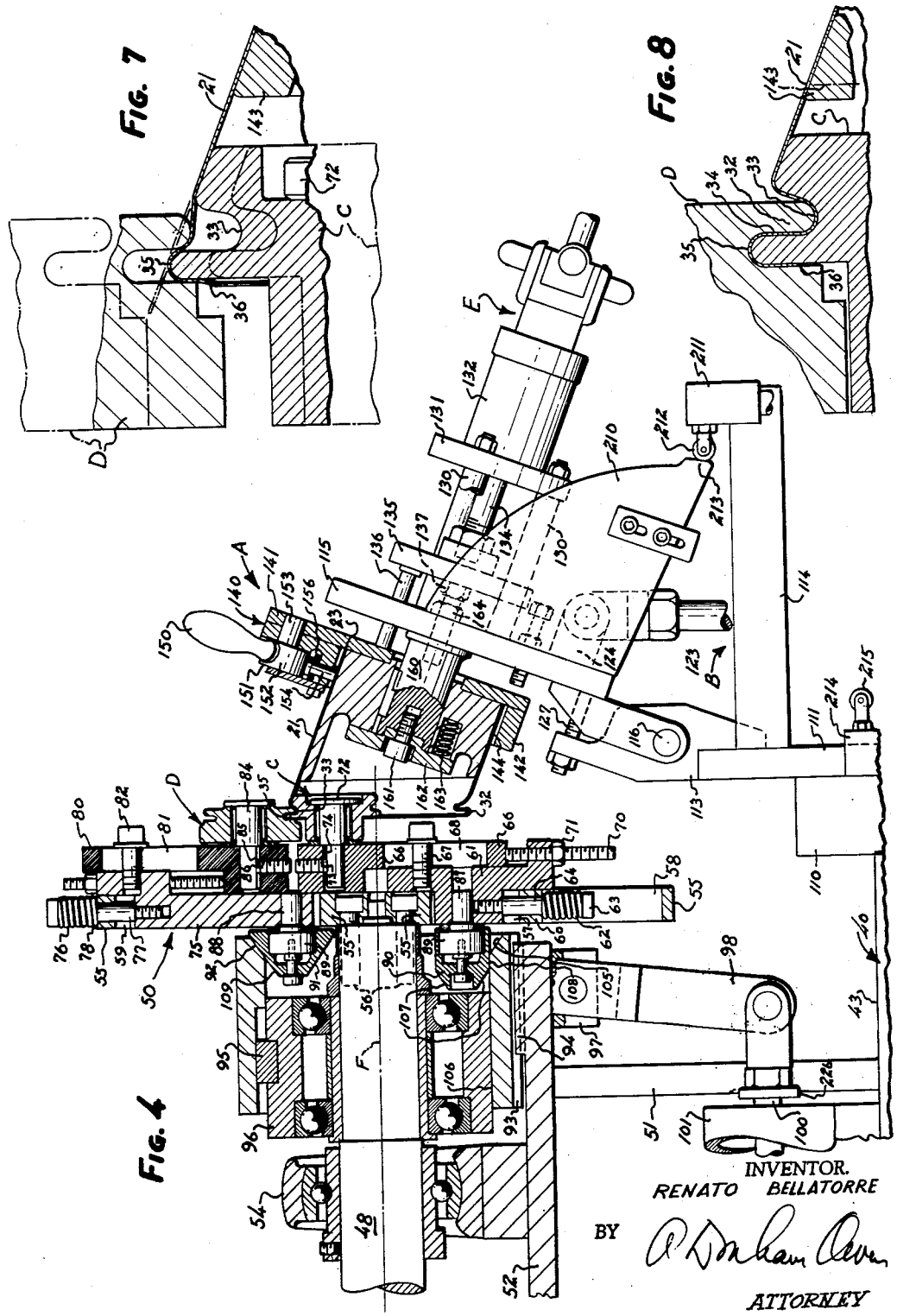

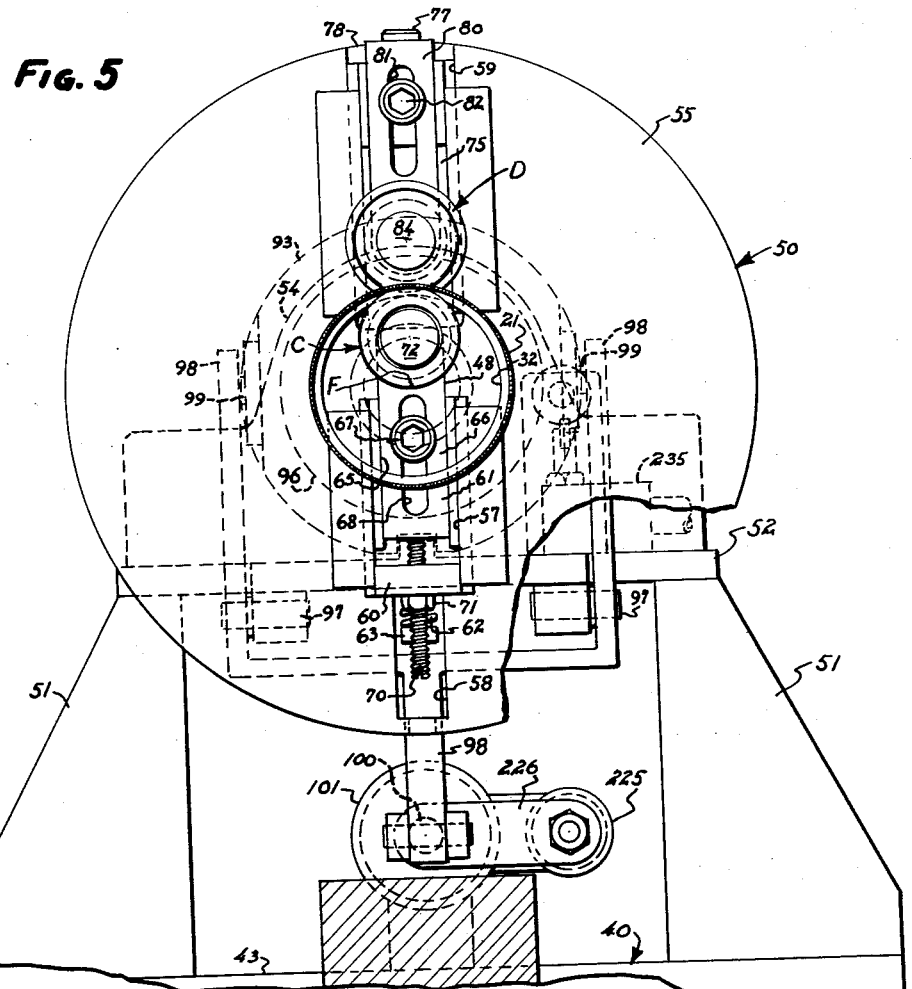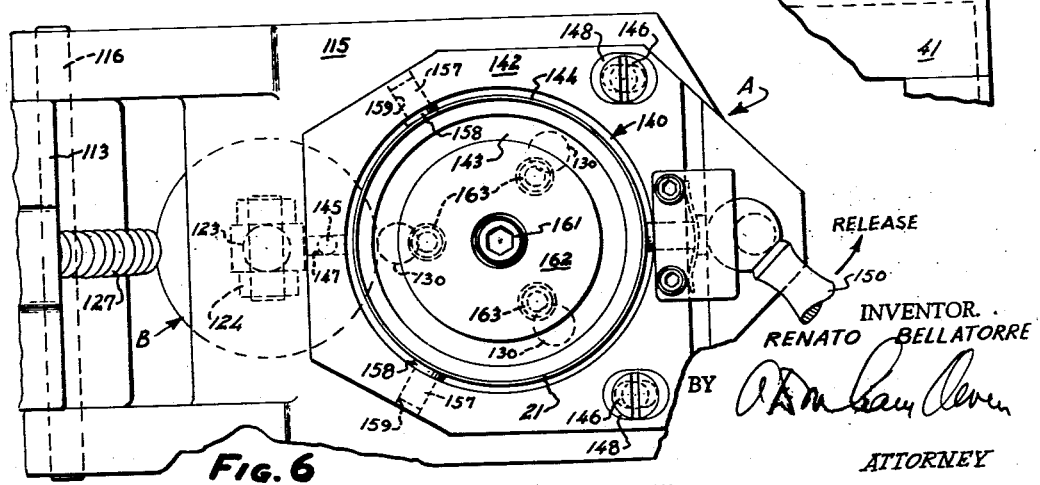

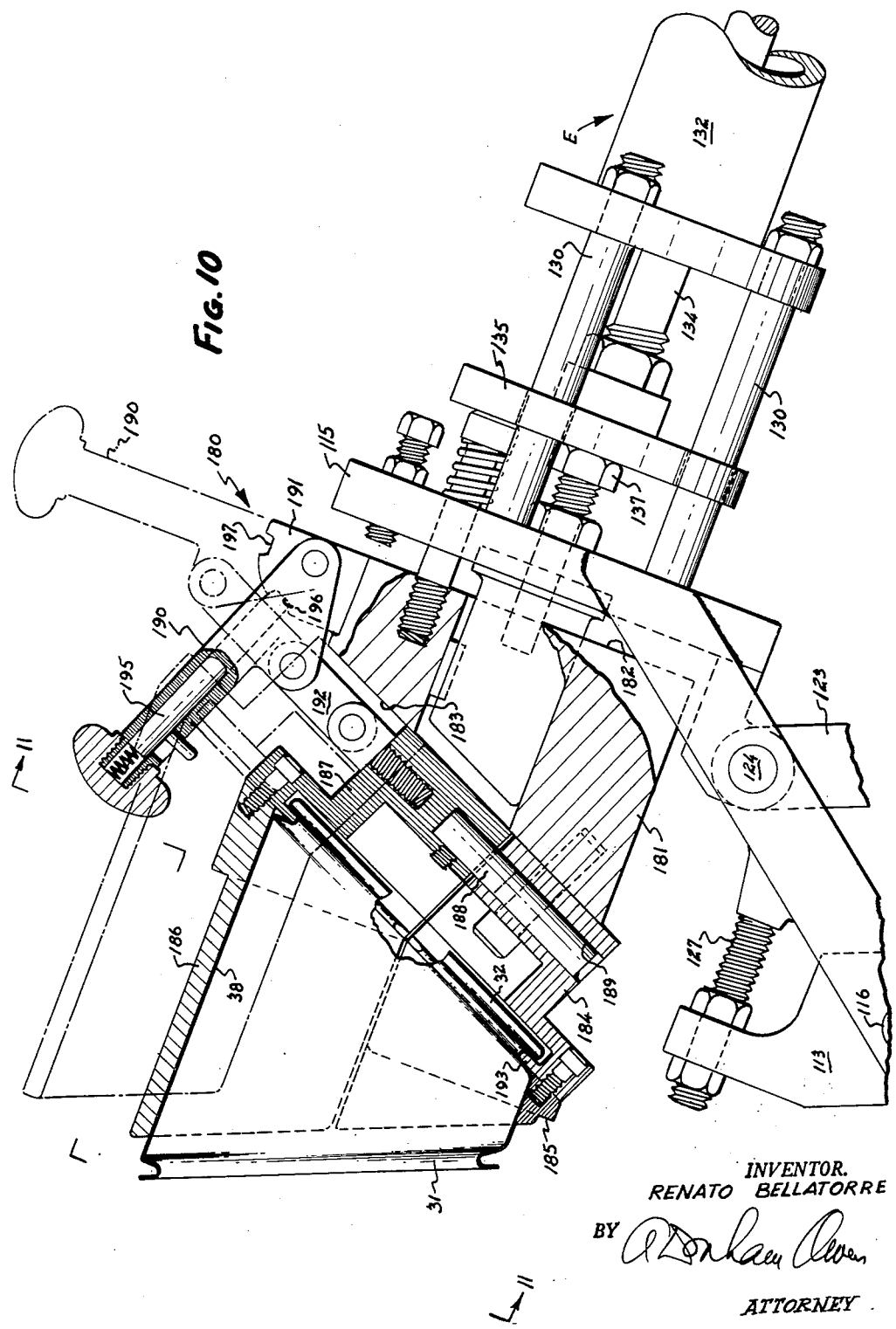

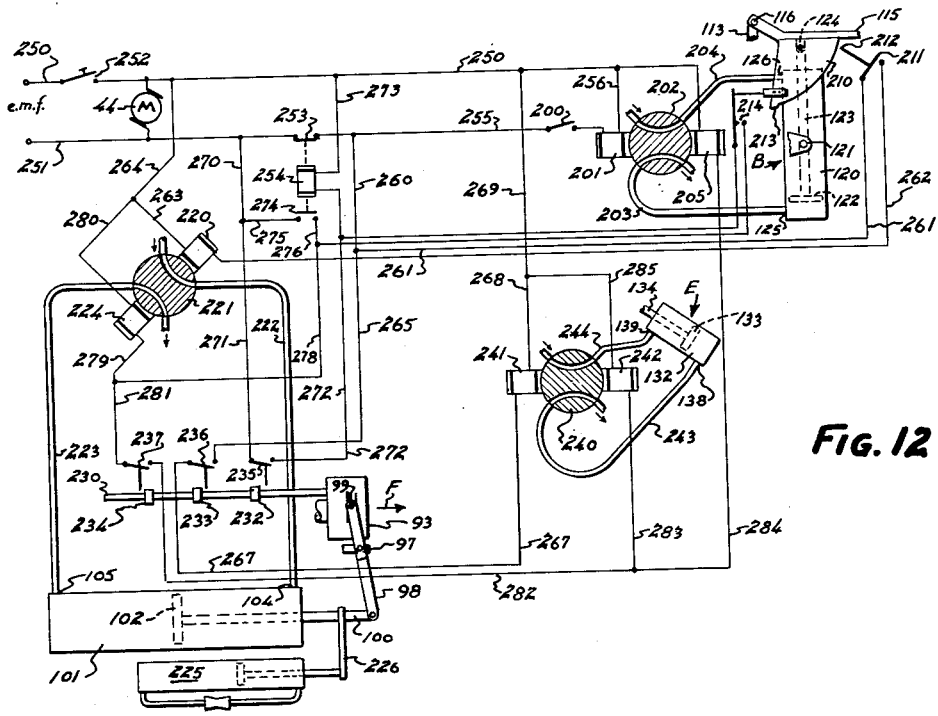
FIG. 12
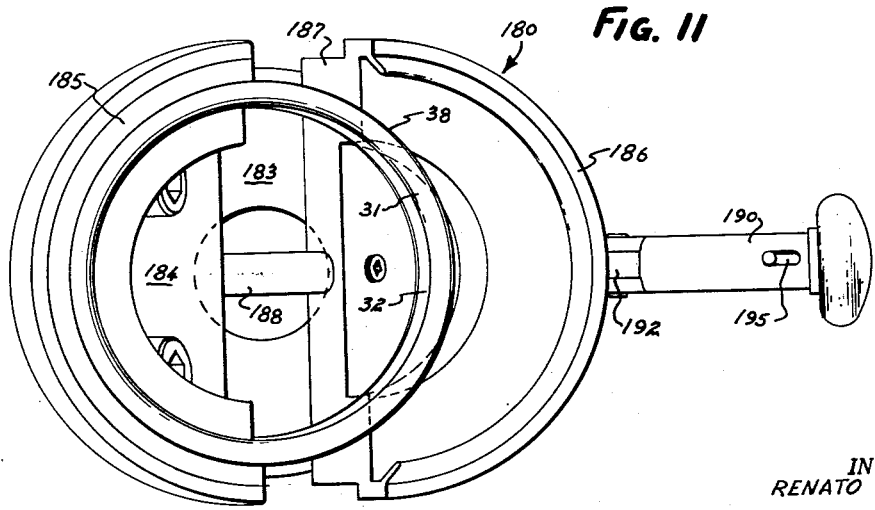
FIG. 11
INVENTOR.
RENATO BELLATORRE
BY 
ATTORNEY pages.

United States Patent Office 3,010,506
Patented Nov. 28, 1961

3,010,506
METHOD AND APPARATUS FOR PROVIDING A THREAD-LIKE COUPLING BEAD ON THIN-WALLED PIPE
Renato Bellatorre, Redwood City, Calif., assignor to William Wallace Company, Belmont, Calif., a corporation of California
Filed Apr. 6, 1959, Ser. No. 804,260
14 Claims. (Cl. 153—9)

This invention relates to a method and apparatus for providing a thread-like coupling bead on thin-walled pipe, such as sheet-metal flue pipe, and especially on elbow sections thereof.

Curved elbows are rarely feasible with double-walled flue pipe and are objectionable for many reasons, even with single-walled flue pipe. Preferably, the elbows are made by joining short straight sections together at an angle; this construction is suitable alike to single-walled and double-walled pipe and, so far as the pipe sections are concerned, introduces no special manufacturing problems for all that has to be done is to cut off some of the ends of these short sections at an angle. Problems do arise, however, in coupling these short sections together. To make this possible, thread-like beads may be formed on the junctures of the elbow sections, but the proper forming of such beads is difficult.

Heretofore, the beads have been formed by crimping in an end portion of the wall, but crimping caused contraction of some portions of the metal wall and extensions of other portions, and the resultant product was crude-appearing and wrinkled, looking somewhat battered, and lacked smoothness. This interfered with proper coupling and was generally unsatisfactory. Some manufacturers gave up and tried another type of connection.

The present invention solves this problem by making the bead in a novel way, namely by rolling it in, in an action rather similar to spinning. This is all done quite rapidly, so that it is well suited to large-scale production, and it produces practically perfect beads. The bead is so smooth and uniform that one might think that the pipe had been molded to that position instead of the bead having been rolled in after the pipe has been seamed.

In order to give these excellent results, a very difficult problem had first to be solved. The operation necessarily has to produce permanent deformation of the metal; that is, the metal has to flow, though it is cold, during the operation. The trouble was that where this operation changed the diameter of a portion of the pipe wall, the thickness of the metal was sharply reduced. In fact, the metal became so thin that it was very weak and often it was even thinned beyond the breaking point.

One of the key features of the present invention is that the thinning effect is effectively minimized by pushing metal into the area being rolled or spun. The invention is so effective in this particular that the amount of thinning is not apparent and can, indeed, be detected only by very accurate instruments.

Another feature of this invention is its adaptability. Two kinds of beads—corresponding to an inner threaded fitting and an outer threaded fitting—can be made on the same machine by a simple substitution of dies. Or two otherwise identical machines can do the two beading operations by differing from each other only as to dies. Also, interchangeable chucks may be provided to handle different kinds of fittings, and different sizes of pipe are readily taken care of with simple changes. Straight pipe as well as elbow sections may be similarly processed.

Manual positioning of the elbow section in the chuck is presently preferred, but otherwise the operation proceeds fully automatically. Nothing depends on the skill or judgment of the operator. The device automatically stops itself when the operation has been completed, leaving the elbow section beaded and ready to take out of the chuck. Adaptation to a fully automatic process is feasible but not economically preferable at the present time.

Still another advantage of the invention is its attention to details affording safety in operation without in any way detracting from efficiency.

Other objects, advantages and features of the invention will appear from the following description of a preferred embodiment thereof.

Figure 1:
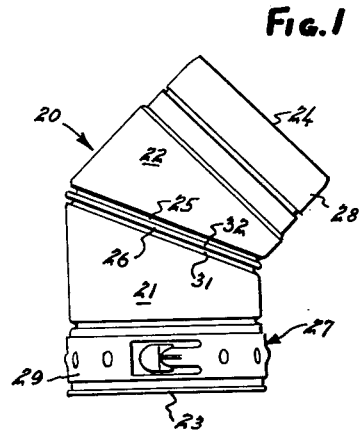
Figure 3:
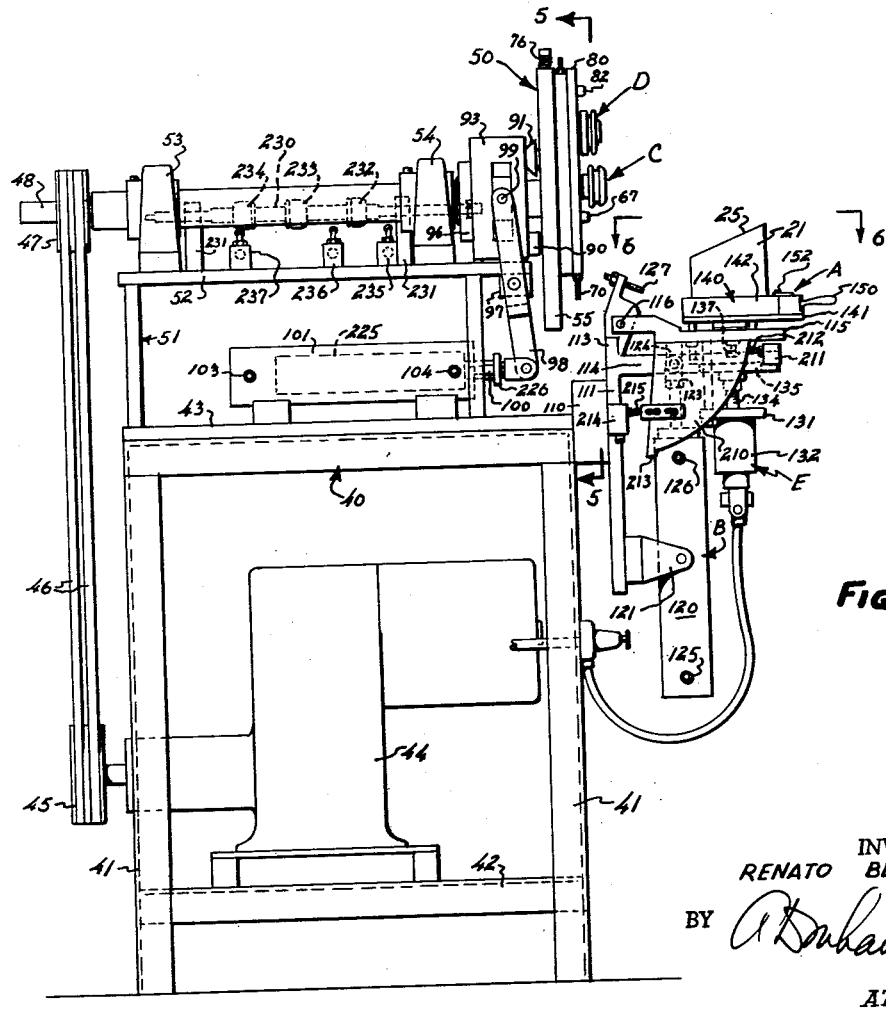
Figure 9:
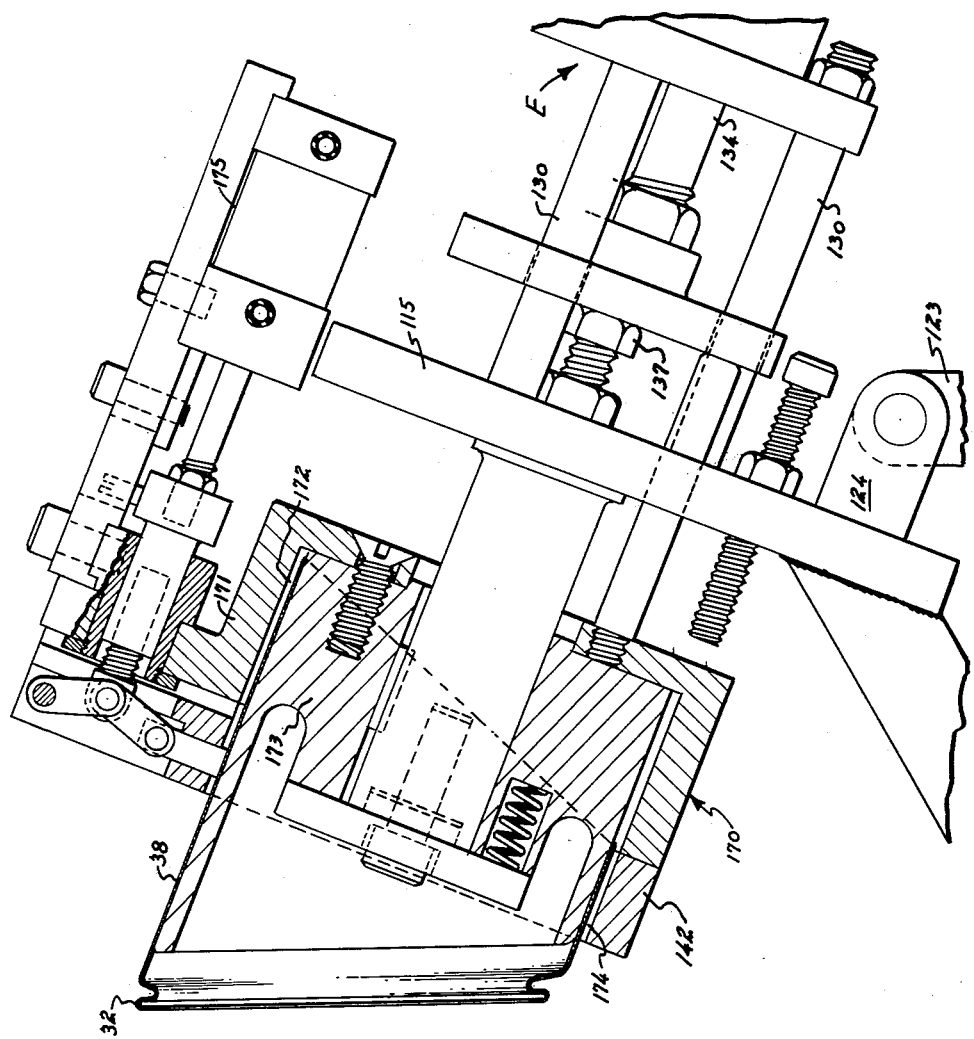

In the drawings:
FIG. 1 is a view in side elevation of a 45° elbow made from two short pipe sections joined by integral beads made according to the principles of the present invention.
FIG. 2 is a similar view of a 90° elbow made from three sections joined together by beads of this invention.
FIG. 3 is a view in side elevation of a machine embodying the principles of the invention, shown in its loading position with an elbow section inserted preparatory to formation of a bead on the upper end thereof.
FIG. 4 is an enlarged fragmentary view in side elevation and partly in section of a portion of the machine of FIG. 3 shown in its bead-forming position, other portions being broken off and still other portions removed to show the elements behind them.
FIG. 5 is an enlarged fragmentary view in front elevation and partly in section of the bead-forming portion of the machine, taken along the line 5—5 in FIG. 3.
FIG. 6 is a top plan view of the elbow-supporting portion of the device, taken along the line 6—6 in FIG. 3, with some portions broken off.
FIG. 7 is a greatly enlarged fragmentary view in elevation and in section showing the formation of a typical bead, with the apparatus shown in solid lines in a partially closed position and in broken lines in an open position.
FIG. 8 is a view similar to FIG. 7, showing the device in its fully closed position.
FIG. 9 is a view in side elevation and in section of a modified form of chuck, for holding a central elbow section when forming its first bead.
FIG. 10 is a view like FIG. 9 of another modified form of chuck for holding the central elbow section when forming its second bead. Solid lines depict the chuck in its closed position, while the broken lines show the chuck in its open position.
FIG. 11 is a view taken along the line 11—11 in FIG. 10, with the chuck in its open position.
FIG. 12 is an electrical-circuit and air-circuit diagram from the apparatus.

*A typical 45° elbow (FIG. 1)*

Before describing in detail the apparatus shown in FIGS. 3 to 12 and its operation, a description of some kinds of products to be made may be helpful. One such product, shown in FIG. 1, is a 45° elbow 20. The elbow 20 is made of two short pieces of straight pipe 21 and 22, each cut off square at one end 23, 24 and cut off on the other end 25, 26 at an angle of 22½°. The end 23 of the pipe 21 is shown provided with a suitable female coupler 27 such as that shown in U.S. Patent No. 2,851,-288, and the end 24 of the pipe 22 is similarly provided with a male coupler 28 of the same type, although other couplers may be used. The female coupler 27 may include a sleeve 29 that may be applied at a late stage in the manufacture.

The present invention relates to the coupling together of the ends 25, 26 where couplers of the types used at 27 and 28 are unsuitable. So the present invention calls for a male bead 31 on the elbow section 21 and a female bead 32 on the elbow section 22. The male bead 31 resembles an exteriorly threaded member and the female bead 32 an internally threaded member. They are very similar and are formed by applying the same principles, using slightly different dies; so the description of either one applies in almost all particulars to the other. Both types are shown in FIG. 10. As shown in FIG. 8, one of these (the female bead 32) may have a helical groove 33 joined by a generally helical wall 34, to a rib 35, and terminating in a locking end 36. The rather vertical nature of the groove 33 and its walls presents the problem of achieving the necessary metal flow without overly thinning the metal walls, as does the similar structure of the male bead 31.

A typical 90° elbow (FIG. 2)

The same sections 21 and 22 are used to make a ninety-degree below 30 by inserting between them a third piece 38 cut off at each end at 22½° and having a male bead 31 at one end and a female bead 32 on the other end. The same problems therefore exist, with the addition that the center piece 38 has to be held differently from the way that the pieces 21 and 22 can be held and also that it has to be held differently when forming the second bead than when forming the first bead, for the already-formed first bead must be accommodated by the chuck when making the second bead.

Whether the elbows 20 and 30 are to be made from single-walled or double-walled pipe makes little difference, so long as proper chucks are provided. And, of course, other fittings than elbows may be similarly made.

The apparatus in general (FIGS. 3 and 4)

In this invention, the elbow section 21, 22, or 38 is supported by a chuck A, which is swung by suitable power means B through an arc of about 67½° (cf. FIGS. 3 and 4), to bring the end 25 or 26 to be beaded between a pair of beading rollers C and D. The rollers C and D are then brought closer together to spin and work the metal into the bead, while a booster power means E pushes the elbow section into the area where the rollers C and D are working. Thus, metal is forced into the area where thinning would otherwise occur, and the thinning therefore does not occur. The bead 31 or 32 is rolled smoothly into the elbow section without weakening the metal walls. Then the rollers C and D are spread apart, and the chuck A is retracted.

This simplified explanation gives the merest introduction to the invention, which has many important features that are brought out in the following detailed description.

The main frame 40 and support of the rotating head assembly 50 (FIG. 3)

The bead forming apparatus of this invention may be supported on a main frame 40 having legs 41 and lower and upper platforms 42 and 43. The lower platform 42 may support a motor 44 that acts through a sheave 45, a belt 46, and a sheave 47, to drive a shaft 48. The shaft 48 carries and rotates a bead-forming head assembly 50, which includes the rollers C and D. The upper platform 43 supports a superframe 51 that has a table 52 and a pair of shaft-supporting bearings 53 and 54 for the shaft 48.

The bead-forming head assembly 50 (FIGS. 3–5)

The head assembly 50 includes a large flywheel 55 that is secured to the end of the shaft 48 by pins 56. Three closed slots 57, 58, and 59 extend radially in line with each other through the flywheel 55. The slots 57 and 58 lie on the same side of the shaft axis F and are separated by a bridge member 60 which may be considered as an integral part of the flywheel 55.

A block 61 is mounted for radial sliding movement in the slot 57 and is normally urged radially outwardly by a spring 62. The spring 62 is compressed between the bridge 60 and a head 63 of the bolt 64. The bolt 64 is secured to the block 61 and extends through the bridge 60 into the slot 58, which is provided to enable radial movement of the bolt 64.

The block 61 has a recess in which an adjustment block 66 is mounted for radial sliding movement, being tightened in any set position by an axially extending set screw 67 whose shank passes through a radial slot 68 into the block 61. A radially extending limit screw 70 is also provided, being held by the block 61 and locked by a lock nut 71 to limit extreme radially outward movement of the block 66. The bead-forming roller C is rotatably mounted on a stepped and capped stub shaft 72 which is held fixed to the adjustment block 66 by a set screw 73 that engages a flattened portion 74 of the shaft 72. The block 66 thereby makes possible regulation of the radial position of the roller C.

The roller D is similarly carried. A block 75 is slidably mounted in the slot 59 and is yieldingly urged radially outwardly by a spring 76 compressed between a bolt 77 (secured to the block 75) and the periphery 78 of the flywheel 55. Again, there is an adjustment block 80 with a radial slot 81 and a set screw 83. A stub shaft 84, again stepped and capped, provides an anti-friction rotatable support for the roller D and has a flat portion 85 so that a set screw 86 holds it in the block 80.

Radial movement of the rollers C and D (FIGS. 3–5)

Now it is apparent that the rollers C and D have their axes of rotation moved radially toward and away from each other by radial movement of the blocks 61 and 75. How is this accomplished, remembering that the blocks 61 and 75 can slide freely in their slots 57 and 59? Each block 61, 75 has a shaft 87, 88 carrying, on an anti-friction bearing 89 (FIG. 4), a cam roller or follower 90, 91, and radial movement of the cam rollers 90, 91 therefore moves the beading rollers C and D radially.

For this purpose, an annular cam 92 is adapted to engage the cam rollers 90 and 91. Radial movement of the cam rollers 90 and 91 results from axial movement of the cam 92. The cam 92 has a body 93 that slides axially along a guide 94 provided on the table 52 and along a guide 95 on a ball-bearing assembly 96, which provides an anti-friction mounting on the shaft 48. The table 52 has depending brackets 97 to which a yoke-type lever 98 is fulcrumed, and the yoke lever is pivotally secured at diametric extremities 99 of the cam body 93. The other end of the lever 98 is pivotally secured to a reciprocating rod 100, which is driven parallel to the shaft 48 by a suitable drive means such as a pneumatic or hydraulic cylinder 101, the rod 100 in that event being secured to the piston 102 (see FIG. 12). Preferably the cylinder 101 is double acting, so that air (or other fluid) applied to one inlet 103 causes the piston 102 and rod 100 to move in (to the left in FIGS. 3, 4, and 12), while air applied to the other inlet 104 causes the piston 102 and rod 100 to move out (to the right in FIGS. 3, 4, and 12).

When the piston 102 and rod 100 move to the left (FIGS. 3, 4, and 12), the lever 98 moves the cam body 93 to the right, i.e., toward the flywheel 55, causing the cam 92 to act on the cam rollers or followers 90 and 91. The cam 92 has an initial conical portion 105 and a subsequent cylindrical portion 106. The cam follower 90 has an initial conical portion 107 and a subsequent cylindrical portion 108. Thus, initial movement of the cam body 93 to the right causes engagement of the conical cam portion 105 with the conical follower portion 107, resulting in a short radially inward movement of the shaft 87. Since the bead-forming roller C is on the opposite side of the axis F and the shaft 87, the result is a short radially outward movement of the roller C. Subsequent movement of the cam body 93 to the right results in the cam follower's conical portion 107 riding off the cam's conical portion 105; then the follower's cylindrical portion 108 engages the cam's cylindrical portion 106. This means that after the initial outward movement of the roller C, the roller C remains at the same radius for the rest of the movement to the right on the cam body 93. Of course, movement of the cam body 93 to the left results in restoration of the roller C to its original position.

The cam follower 91 is shaped differently; all its cam surface 109 is conical; as a result, it always rides on the conical cam portion 105. This causes radially inward movement of the shaft 88. Since the shaft 88 and the bead-forming roller D are on the same side of the axis F, this results in constant radially inward movement of the roller D during the movement of the cam body 93 to the right, and constant retraction when the body 93 moves to the left.

Thus, the radially inner roller C moves a short distance out and then rotates at a fixed radius, while the outer roller D moves in constantly and so rotates at a gradually decreasing radius. Obviously, this action will result in forming any cylindrical piece of metal positioned between the two rollers. As such, this would be a rolling or spinning action that might result in stretching and therefore thinning the metal section. But the present invention counteracts this in a manner soon to be explained, after first showing how the chuck A moves the elbow member 21, 22, or 38 into the bead-forming position between the rollers C and D.

*The pivoted support of the chuck A (FIGS. 3, 4, and 6)*

Whatever the type of the chuck A (and several types are shown), its pivotal support and action during actual operation remain the same.

The frame 40 is provided with an extension 110, which supports a generally vertical stationary frame member 111 having a depending portion 112 and an upper portion 113 and also having a horizontal exterior 114 at the junction of the portions 112 and 113.

The chuck A is supported for rotational movement with a base 115 that is pivotally secured by a shaft 116 to the upper frame portion 113. A pneumatic (or hydraulic) cylinder 120 (or other power means) is mounted pivotally to a bracket 121 on the frame member 112. The cylinder 120 has a piston 122 (FIG. 12) with a rod 123 whose outer end is pivotally connected to a bracket 124 on the base 115. Inlets 125 and 126 make the cylinder 120 double-acting. When air enters the inlet 125 under pressure, the piston 122 and rod 123 are moved up, and this rotates the base 115 about 67½° on its pivot 116. When air under pressure enters the inlet 120, the piston 122 and rod 123 move down and restore the base 115 to its horizontal position. The horizontal position (FIG. 3) is the loading and unloading position, while the vertical position (FIG. 4) is the bead-forming position, wherein the elbow member 21 (or 22 or 38) is inserted between the rollers C and D and the bead formed. An adjustable stop 126 on the frame member 113 engages the base 115 to limit its movement once the vertical position has been reached and to insure exact location relative to the rollers C and D.

*The booster E (FIGS. 3 and 4)*

The chuck A moves with the base 115 so far as rotational movement is concerned, but it is not fixed rigidly to the base 115. A bracket 130 depends from the base 115 and supports a bracket 131 below and parallel to the base 115.

The bracket 131 supports booster power means E, such as a pneumatic cylinder 132 with a piston 133 (see FIG. 12) and a rod 134 which carries a bracket 135. The bracket 135 carries a pair of rods 136 that extend perpendicularly through the base 115 and normally abut the bottom of the chuck A. A nut 137 also provides a lost-motion connection with the chuck A. Thus, the chuck A is actually supported in a lost-motion connection by the piston rod 134, and movement of this rod due to the application of air under pressure to either inlet 138 or 139 of the cylinder 132 will move the chuck A along the axis of the cylinder 132 and therefore rectilinearly away from or back toward the base 115.

From the foregoing it will be apparent that the desired result of preventing thinning of the metal during its formation into crests and grooves can now be prevented by the booster E pushing the elbow section 21, 22, or 38 forward—feeding it into the rollers C and D at the same time that the action tending to cause thinning is going on. No booster feeder is employed until needed and then it is carried on at the desired rate, corresponding to the effect of the cam 92 and follower 91 tending to close the rollers C and D together. A proper rate of air feed, as determined by well-known valving, etc., easily accomplishes this. The serial order, timing, and synchronization of these operations will be discussed soon, after a brief look at some different types of chucks A that may be used and of the roller C and D configuration.

*A chuck 140 for the sections 21 and 22 (FIGS. 3, 4, and 6)*

The end sections 21 and 22 of the elbows 20 and 30 both have square-cut ends 23 and 24. The sleeve 29 on the coupler 27 can be added later; so far as the present invention is concerned, the sections 21 and 22 may be held by the identical chuck 140.

A chuck 140 comprises a bottom plate 141, which supports an outer chuck member 142 and an inner cylindrical chuck ring 143. Between the member 142 and the ring 143 is an annular cylindrical clearance 144 that is substantially wider than the wall thickness of the elbow sections 21 and 22, enabling easy insertion of the square-cut end 23 or 24, which is bottomed on the plate 141. The inner ring 143 is held stationary with respect to the plate 141, as by being bolted to it, while the outer member 142 is mounted for relative sliding movement, being guided by studs 145, 146 on the plate 141 engaging slots 147, 148 on the member 142.

A chuck-closing handle 150 is secured to a cam 151 that comprises a cylindrical disc 152 mounted eccentrically on a stub shaft 153, which is rotatably mounted in the plate 141. The disc 152 bears against a stud 154 that extends radially and slidably through the member 142, and bears against its outer edge 155 through a leaf spring 156. Thus, turning the handle 150 clockwise (FIG. 6) results first in driving the stud in radially inwardly into contact with the wall of the elbow member 21 or 22, and in compression of the spring 156. Further clockwise movement of the handle 150 moves the outer member 142 to the left (in FIG. 6). The result is to clamp the elbow section 21 or 22 tightly against two studs 157 whose heads 158 project from openings 159 in the clearance 144. This holds the elbow section 21 or 22 firmly during the remaining operations. After completion of the operations, the chuck 140 is loosened by moving the handle 150 counterclockwise.

Obviously, a pneumatic device 175, as shown in FIG. 9, may be made to operate the handle 150 instead of doing so manually, to assure uniform and tight clamping pressure and eliminate the need for the operator to be strong and consistent.

A core member 160 may be secured to the inner ring 143 by a bolt 161 and plate 162, which engage the ring 143 through a shock-absorbing spring connection 163. A wear member 164 on the opposite end of the core member 160 may normally abut the member 137, to establish the lost-motion connection referred to earlier, by which the members 136 engage the bottom plate 141.

*A chuck 170 for a middle elbow member 38 with both ends unbeaded (FIG. 9)*

The chuck 140 cannot be used for holding middle sections 38, as cut off at an angle at both ends. The chuck 170 is an adaptation thereof for this purpose. The bottom member 141 is replaced by a bottom member 171 providing a cylindrical recess 172, and the ring 143 is replaced by a much deeper ring 173. Otherwise, the member 142 remains as before, as does the handle 150, and operation is substantially the same except for provision of a deeper clearance or groove 174 and for the use of a pneumatic device 175 in place of the manual operation of the handle 150, to assure tight closure and the same action each time.

*A chuck 180 for a middle section 38 having one end beaded (FIGS. 10 and 11)*

When one end of the middle section has been beaded, that end is placed in a different chuck 180 for beading the other end. Here an annular bottom member 181 has a lower end 182 perpendicular to its axis and a flat upper end 183 inclined thereto. A stationary semi-cylindrical chuck base 184 is bolted rigidly to the bottom member 181, and a semi-cylindrical sleeve member 185 is bolted to the base member 184, the length of the sleeve tapering in to a narrow end. A mating semi-cylindrical sleeve member 186 is secured to a movable semi-cylindrical mating base member 187. The base member 187 slides across the face 183 and is guided by a guide pin 188 that slides through an opening 189 in the base member 184.

A handle 190 is pivoted to a bracket 191 on the bottom member 181, and a link 192 is pivotally connected at one end to the handle 190 and at the other end to the movable base member 187. The handle 190 moves 90° from a position where the chuck bases 184 and 187 abut, and the sleeves 185 and 186 abut, to a position where they are spread apart. In the first position, shown in solid lines, the elbow member 38 may be inserted or removed, its bead 32 finding a place 193 provided therefor on the bases 184 and 187. Then the chuck 180 is spread to clamp the member 38 firmly while making the other bead 31.

The handle 190 is provided with locking means for each position, comprising a spring-urged latch pin 195 and notches 196 and 197 on the bracket 191.

*Form of the beading rolls C and D and their operation (FIGS. 7, 8)*

The precise form of the beading rolls C and D depends on the form of bead desired and whether a male or female bead 31 or 32 is to be formed. FIGS. 7 and 8 illustrate typical forms for female beading and show how the booster E gives thrust to the metal to help it to be shaped from its cylindrical form in FIG. 7, (broken lines) through a preliminary stage in FIG. 7 (solid lines) to a final shape in FIG. 8, thinning being avoided by the thrust of the metal pushed into the beading rolls C and D during forming.

*The actuating mechanisms used to determine sequence of operations (FIGS. 3–5 and 12)*

Before running through a complete cycle of operations or even discussing the complete electrical or pneumatic circuits, the actuating mechanisms for the circuits will be described.

During operation, the motor 44 runs continually, rotating the shaft 48 at all times. Each operating cycle is initiated by pressing a switch 200, which may be a foot switch or, for safety's sake, a two-hand switch requiring the operator to have both hands free of the apparatus. The switch 200 starts the power means B, which in this instance means the double-acting pneumatic cylinder 120 and its valves and controls. What the switch 200 does, in this instance, is to energize a solenoid 201 that causes a valve 202 to send air under pressure via a conduit 203 into the lower inlet 125 of the cylinder 120 to raise the piston 122. At the same time, the valve 202 bleeds the upper end of the cylinder 120 to atmosphere via a conduit 204 attached to the upper inlet 126. After the beading operation has been completed, the piston 122 is lowered by rotation of the valve 202 to bleed the lower end of the cylinder through the conduit 203 and send air under pressure into the conduit 204. This is done by a second solenoid 205, the valve 202 being of the type that holds the position of last actuation until the opposite solenoid is energized and the other one de-energized.

Raising the piston 122 rotates the base 115 from its horizontal to its vertical position. An arcuate cam 210 of about 67½° is secured to, depends from, and rotates with the base 115. A switch 211 mounted on the horizontal frame member 114 has a roller 212 in contact with the cam 210, and when a high spot 213 at the lower end of the cam 210 contacts the roller 212, it closes the switch 210. Similarly, a normally closed switch 214 is mounted on the vertical frame member 111 and has a roller 215, and the switch 214 is opened when the base 115 is horizontal, by an adjustable projection 216 secured to the cam 210.

Closure of the switch 211 energizes a solenoid 220, which is one of two solenoids for a valve 221. The solenoid 220, when energized, causes the valve 221 to send air under pressure via a conduit 222 into the right-hand inlet 104 (FIGS. 3 and 12) of the cylinder 101 and to bleed the other inlet 105 to atmosphere via the conduit 223, thereby moving the piston 102 to the left. A second solenoid 224, when energized, reverses this arrangement and moves the piston 102 to the right. As shown in FIGS. 5 and 12, a dampening cylinder or hydro-check valve 225 may be coupled to the piston rod 100 by a link 226, to ease the end-points of the stroke of the rod 100.

When the rod 100 moves, the cam body 93 moves in the opposite direction, and when it moves it carries with it a shaft 230 which moves parallel to the shaft 48 and is supported by bearings 231 mounted on the table 52. The shaft 230 may be threaded, for convenience in adjustably securing thereon three collars 232, 233, and 234. Below the shaft 230, the table 52 supports three switches 235, 236, and 237, each with a roller that is contacted by one of the collars to close the switch. Adjustment of the collars 232, 233, and 234 thus enables accurate timing of the closure of the switches 235, 236, and 237, relative to the beading action of the rollers C and D. Each switch 235, 236, and 237 is actuated only by engagement of its collar 232, 233, 234 in one direction. The switches 235 and 236 are closed only when their collars 232 and 233 move against them from left to right, while the switch 237 is closed only when its collar 234 moves against it from right to left (as in FIGS. 3 and 12).

The switch 235 is used to stop the movement of the cam body 92 from left to right and to reverse it, thereby limiting closure of the rollers C and D and forcing them open, by energizing the solenoid 224.

The switches 236 and 237 control the booster cylinder 132 by operating a valve 240 through respective solenoids 241 and 242. Thus, closure of the switch 236 energizes the solenoid 241 and moves the valve 240 to send air under pressure via a conduit 243 into the lower cylinder inlet 138, meanwhile bleeding the upper end of the cylinder via the port 139 and a conduit 244. Closure of the switch 237 reverses this action.

*The electrical circuit (FIG. 12)*

Electric power is applied across lines 250 and 251, and upon manual closure of a main switch 252 the motor 44 will be operated. Upon closure of the manual or pedal initiation switch 200, current also passes by the line 251 through normally closed contacts 253 of a relay 254 and via a lead 255 and switch 200 to the solenoid 201 and thence to the line 250 by a lead 256. This energizes the solenoid 201, and moves the valve 202 to raise the piston 122.

Raising the piston 122 effectuates rotation of the cam 210, and when the cam 210 finally closes the switch 211 current flows from the line 251 via the relay contacts 253, leads 260 and 261, the switch 211, a lead 262, the solenoid 220 and leads 263 and 264, to the line 250, energizing the solenoid 220. This moves the valve 221 to move the piston 102 to the left and thereby move the cam body 93 and the shaft 230 to the right.

Movement of the shaft 230 to the right soon results in closure of the switch 236. Then current flows via line 251, the relay contacts 254, the leads 260, 265, and 266, the switch 236, and a lead 267 to the solenoid 241, whence return leads 268 and 269 go to the line 250. The result is that the valve 240 is moved to cause the booster piston 133 to advance, feeding metal into the beading rolls C and D as they bead, thereby getting forming without substantial thinning.

Further movement of the shaft 230 to the right closes the switch 235. This results in energizing the relay 254, by current passing from the line 251 by lead 270, the switch 235, leads 271 and 272, the relay 254, and a lead 273 to the line 250. Energization of the relay 254 opens the normally closed contacts and thereby de-energizes the solenoids 201, 220, and 241, the valves 202, 221, and 240 holding their associated pistons in their same positions, however. Energization of the relay 254 also closes contacts 274; the contacts 274 connected so that the relay 254 is self-holding, by current flowing from the line 251 via the lead 270, a lead 275, the contacts 274, a lead 276, the normally closed switch 214, to the lead 272. Closure of the contacts 274 also causes retraction of the piston 102 and the cam body 93 by sending current from line 251 via the leads 270 and 275, the contacts 274, the lead 276, and leads 278 and 279 to the solenoid 224, and from there by a lead 280 and the lead 264 to the line 250. The shaft 230 thereupon moves back to the left, without affecting the switches 235 and 236 on this return stroke.

On its return stroke, however, the shaft 230 does effect closure of the switch 237, and current then flows from the line 251 via the leads 270 and 275, the contacts 274, the leads 276 and 278, a lead 281, the switch 237, and a lead 282 to parallel leads 283 and 284. By lead 283 the current flows through the reverse solenoid 242 for the booster E and by leads 285 and 269 back to the line 250. By lead 284 the current flows through the reverse solenoid 205 for the power cylinder 120 and by a lead 285 back to the lead 250. Both the pistons 133 and 122 are thereupon retracted. When the base 115 is horizontal, the extension 216 on the cam 210 opens the normally closed switch 214, thereby de-energizing the relay 254 and de-energizing the solenoids 205, 224, and 242 but leaving their valves 202, 221, and 240 unaltered.

Operation

Although the operation will be clear from the foregoing, it will be briefly reviewed.

At the beginning of a work period, the operator puts in the proper bead-forming dies C and D and the proper chuck 140, 170, or 190. The forming dies C and D depend on whether the male bead 31 is being formed on an elbow section 21 or 38 or a female bead 32 is being formed on an elbow section 22 or 38. The blocks 66 and 80 are used to adjust the rollers C and D to the pipe diameter. The chuck 140 is used with either of sections 21 and 22. The chuck 170 is used when forming the first bead 32 on the center section 38, and the chuck 180 is used when the second bead 31 is formed on the section 38.

The preliminary adjustments having been completed, the operator turns on the main switch 252 and leaves it on until he closes down for the day or changes pipe sections or size. The motor 44 thus runs and drives the shaft 48 to rotate the assembly 50, including both rollers C and D.

He then puts an elbow section 21, 22, or 38 into its proper chuck 140, 170, or 180 and clamps the chuck tight by using the handle 150 or 190 or the air device 175. Now he is ready to begin a cycle.

He closes the switch 200, and the cycle begins. It will run to completion whether he stays to watch it or not, so he usually turns to another identical machine, takes out a completed elbow section, and puts another one needing beading into its chuck B. He may thus bead both the pieces 21 and 22 simultaneously, though in different machines; or he may bead both ends of a center section 38, one in each machine.

When the switch 200 closes, the solenoid 201 is energized and moves the valve 202 to send air into the cylinder port 125 and raise the piston 122. The piston rod 123 thus swings the base 115 about its pivot to a vertical position, where the elbow section is between the bead rollers C and D, which at this time are spaced away from it. Movement of the base 115 involves movement of the cam 210, which first closes the switch 214, preparing a later operation but having no immediate effect, since the contacts 274 are open, the relay 254 being de-energized. When the base 115 is vertical, the high point 213 of the cam 210 engages the roller 212 and closes the switch 211.

Closure of the switch 211 now energizes the solenoid 220, and the valve 221 sends air into the cylinder 201 to move the piston 102 and rod 100 to the left. The link 98 transmits this movement to the cam body 93 to move it forward (to the right in FIGS. 3, 4, and 12) along with the shaft 230. The cam 92 thus engages the followers 90 and 91 and begins moving the rollers C and D toward each other, closing in on opposite sides of the elbow section 21, 22, or 38. The inner roller C moves out into contact with the inner surface of the metal wall and then rotates at a fixed radius, for its cam follower 90 stops moving in when its conical face 107 rides off the conical face 105. At this time the outer roller D has moved in the same amount and is in contact with the outer surface of the metal wall. But it does not stop there; it continues to move in, rotating all the while, and begins to form the metal, as shown in FIG. 7.

After some such formation, the metal wall would begin to be stretched and thinned, but just at that point the collar 233 closes the switch 236, energizing the solenoid 241. Thereupon, the valve 240 sends air into the port 138 of the cylinder 132, and the piston 133 and rod 134 move to the left, impelling the chuck B closer to the assembly 50 and feeding metal into the rollers C and D just as they form it. So the rollers C and D move to the position shown in FIG. 8, where the bead is completed, all the while metal is fed into the beading. Then the collar 232 trips the switch 235. This immediately energizes the self-holding relay 254, opening the contacts 253 and closing the contacts 274. Opening the contacts 253 stops further movement of the booster rod 134 and of the chuck B by de-energizing the solenoids 241 and 201, the valves 240 and 202 being held in status quo. The solenoid 220 is also de-energized, and the solenoid 224 is simultaneously energized, to reverse the valve 221 and reverse the movement of the piston 102 and rod 100 and also reverse the movement of the cam body 93 and the shaft 230.

The rollers C and D are therefore moved apart, enabling retraction of the elbow section 21, 22, or 38. Soon, the collar 234 closes the switch 237, causing the retraction of the chuck A by energizing the solenoids 205 and 242 to reverse the valves 202 and 240 and move the pistons 122 and 133 down.

When the table 115 is again horizontal, the cam extension 216 opens the switch 215, de-energizing the relay 254 and the solenoids 205, 224, and 242. The valves 202, 221, and 240 thereupon maintain the status quo and the operator can loosen the chuck B and remove the beaded member. The cycle has been completed.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. Apparatus for beading an end of a thin-walled tubing section, including in combination: a pair of beading rolls, means for eccentrically rotating said rolls together; first section-moving means for moving said end a fixed amount to place it in between said rolls during rotation of said rolls; means for causing said rolls to move radially toward each other during rotation, to come against said section on opposite sides thereof and to form a bead on said section; and second section-moving means for moving said section additionally at a predetermined rate during said forming to push metal into the portions being beaded and thereby prevent the metal from being thinned.

2. Apparatus for beading an end of a thin-walled tubing section, including in combination: a rotating shaft; a head assembly on said shaft; a pair of beading rolls mounted on said head assembly for limited radial movement toward and away from each other; means for supporting a said tubing section; first means for moving said support means a fixed amount so as to move said ends between said beading rolls; means for causing relative radial movement of said rolls toward each other to come against said section end on opposite sides thereof and to form a bead on said section; and second means for moving said support means additionally at a predetermined stage during forming to push said section additionally in between said rolls to supply additional metal that prevents the metal walls being beaded from being thinned.

3. Apparatus for beading an end portion of thin-walled tubing, including in combination: a pair of beading rollers; first tubing-moving means for moving said end portion in a fixed amount to place it in between said rollers; means for rotating said rollers around the periphery of said tubing on opposite sides thereof; means for causing relative movement of said rollers toward each other and against said end portion so that said beading rollers engage said tubing end portion in intermeshing relation and form a bead on said end portion; and second tubing-moving means for forcing said end portion to move into said rollers at a predetermined stage and at a predetermined rate during said forming to push metal into the portions being beaded.

4. In a device for forming a thread-like coupling bead on end portions of sections of thin-walled pipe and the like, said device having a pair of intermeshing forming rollers rotatably mounted on a frame, a chuck to rigidly support a said section, means to move said chuck a fixed amount to position a portion of the wall of said section between said forming rollers, means to force said forming rollers together to shape the wall of said section to the intermeshing shape of said forming rollers, and means to rotate said forming rollers around the end of said pipe section; the improvement therewith comprising separate means to apply additional axial pressure on said pipe section toward said forming rollers at a predetermined time during rotation thereof.

5. A device for providing a thread-like coupling bead on sections of thin-walled pipe and the like, including in combination: a meshing pair of metal forming means; chuck means to rigidly support said pipe section; means to move said chuck means a fixed amount to position one end of said pipe section between said forming means; means to force said forming means together in intermeshing relationship to work the end of said pipe section into a bead; means to rotate said forming means at a predetermined stage around the periphery of the end of said pipe section; and booster means associated with said chuck means to push said pipe section toward said forming means while the forming means are working the end of said pipe section.

6. A device for providing a thread-like coupling bead on sections of thin-walled pipe and the like, including in combination: a meshing pair of metal forming means; chuck means to rigidly support said pipe section; chuck-moving means moving a fixed amount to position one end of said pipe section between said forming means; closing means actuated when said chuck-moving means has positioned said pipe section to force said forming means together in intermeshing relationship to work the end of said pipe section into a bead; means to rotate said forming means around the periphery of the end of said pipe section as said forming means are forced together; and booster means associated with said chuck means and actuated only when said closing means reaches a predetermined position to push said pipe section further toward said forming means while the forming means are working the end of said pipe section.

7. A device for providing a thread-like coupling bead on elbow sections of thin-walled pipe and the like comprising in combination: a frame; a meshing pair of metal forming means mounted movably on said frame; chuck means pivotally mounted with respect to said frame, to rigidly support said elbow section; means to swing said chuck means about its pivot from a loading position to a beading position where one end of said elbow section lies between said forming means; closing means responsive to the position of said chuck means to force said forming means together in intermeshing relationship to work the end of said elbow section into a bead; means to rotate said forming means around the periphery of the end of said elbow section; and booster means associated with said chuck means and responsive to the relative positions of said forming means to push said elbow section further into said forming means while the forming means are working the end of said elbow section.

8. A metal working device adapted to automatically provide a thread-like coupling bead on elbow sections of thin-walled pipe, including in combination: a power-driven flywheel; a pair of bead forming rollers on said flywheel; a power-driven chuck means adapted to rigidly support an elbow pipe section; means to move said chuck means to pivot said elbow pipe section so that its wall is between said bead forming rollers, and the center of the end of said open pipe section is substantially aligned with the center of said flywheel; means responsive to the position of said chuck means to close said bead-forming rollers; feed means associated with said chuck means to push said elbow pipe section toward said bead-forming rollers; and means responsive to the closing of said means to close said rollers to actuate said feed means.

9. A metal working device adapted to automatically provide a thread-like coupling bead on elbow sections of thin-walled pipe, including in combination: a power-driven rotatable flywheel; inner and outer bead-forming rollers rotatably and slidably mounted on said flywheel; an annular cam mounted slidably adjacent and along the rotation axis of said flywheel; a first cam follower associated with said inner bead-forming roller and in engagement with said annular cam to move said inner roller radially outwardly a predetermined amount upon initial movement of said annular cam toward said flywheel; a second cam follower associated with said outer bead-forming roller to move said outer roller radially inwardly steadily upon movement of said annular cam toward said flywheel; a power-driven chuck means adapted to rigidly support an elbow pipe section, said chuck means being pivotally mounted relatively to said flywheel; power means to cause movement of said chuck means to pivot said elbow pipe section so that its wall is between said bead-forming rollers, and the center of the end of said open pipe section is substantially aligned with the center of said flywheel; chuck cam means associated with said chuck; cam-actuated means responsive to the position of said chuck cam means to cause movement of said annular cam toward said flywheel; feed means associated with said chuck means to push said elbow pipe section toward said bead-forming rollers; an actuating cam moved axially with said annular cam; and cam-operated means responsive to said actuating cam to actuate said feed means.

10. The device of claim 9 wherein said annular cam is generally cylindrical with a sloping rim, said first cam follower has a sloping face portion and a cylindrical face portion, and said second cam follower has a sloping face.

11. The device of claim 9 wherein there is a second actuating cam moved axially with said annular cam and cam-operated means associated therewith to reverse the movement of said annular cam and send it away from said flywheel and also to stop movement of said feed means.

12. The device of claim 11 wherein there is a third actuating cam moved axially with said annular cam and cam-operated means associated therewith and actuated only on movement of said annular cam away from said flywheel to reverse said power means and restore said chuck means to its initial position.

13. A method of beading an end of a thin-walled tubing section, a predetermined fixed amount, including in combination: beading said end while moving said section at a predetermined stage during the forming of the bead to push a predetermined amount of metal into the portions being beaded and thereby prevent the metal from being thinned.

14. A method for beading an end of a thin-walled tubing section that is cut off at an angle, including in combination: beading said end and moving said section a predetermined fixed distance at a predetermined stage during the forming of the bead in a direction perpendicular to the plane of the end to push a predetermined amount of metal into the portions being beaded and thereby prevent the metal from being thinned.

References Cited in the file of this patent

UNITED STATES PATENTS

| | | |
|---|---|---|
| 1,850,958 | Horvath | Mar. 22, 1932 |
| 2,223,472 | Whitten | Dec. 3, 1940 |
| 2,312,225 | Wilkinson | Feb. 23, 1943 |
| 2,445,303 | Fisher | July 13, 1948 |
| 2,748,828 | West | June 5, 1956 |
| 2,809,687 | Ogle | Oct. 15, 1957 |

UNITED STATES PATENT OFFICE
CERTIFICATE OF CORRECTION

Patent No. 3,010,506                          November 28, 1961

Renato Bellatorre

It is hereby certified that error appears in the above numbered patent requiring correction and that the said Letters Patent should read as corrected below.

Column 3, line 20, for "below" read -- elbow --; column 6, lines 4 and 5, for "rectilinearly" read -- rectilineally --; column 11, line 35, strike out "in", first occurrence; lines 68 and 69, strike out "at a predertermined stage"; line 72, before "are" insert -- at a predetermined stage --; column 13, line 22, after "section" strike out the comma.

Signed and sealed this 1st day of May 1962.

(SEAL)
Attest:

ERNEST W. SWIDER                          DAVID L. LADD
Attesting Officer                            Commissioner of Patent: